(12) United States Patent
Nakatani

(10) Patent No.: US 8,148,792 B2
(45) Date of Patent: Apr. 3, 2012

(54) PRESSURE SENSOR AND METHOD FOR MANUFACTURING THE PRESSURE SENSOR

(75) Inventor: Goro Nakatani, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 206 days.

(21) Appl. No.: 12/588,241

(22) Filed: Oct. 8, 2009

(65) Prior Publication Data

US 2010/0090297 A1    Apr. 15, 2010

(30) Foreign Application Priority Data

Oct. 9, 2008    (JP) .................................. 2008-262906

(51) Int. Cl.
*H01L 29/84*    (2006.01)

(52) U.S. Cl. ......... 257/415; 257/E29.324; 257/E21.002; 257/318; 257/787; 438/50

(58) Field of Classification Search .................. 257/415, 257/E29.324, E21.002, 318, 787; 438/50; 310/324, 365, 340, 320, 344; 333/187
See application file for complete search history.

(56) References Cited

U.S. PATENT DOCUMENTS

| | | | | |
|---|---|---|---|---|
| 4,456,850 A * | 6/1984 | Inoue et al. | .................... | 310/324 |
| 5,925,973 A * | 7/1999 | Eda et al. | ...................... | 310/348 |
| 6,131,256 A * | 10/2000 | Dydyk et al. | ................ | 29/25.35 |
| 6,437,484 B1 * | 8/2002 | Nishimura et al. | ........... | 310/324 |
| 6,556,103 B2 * | 4/2003 | Shibata et al. | ................. | 333/187 |
| 6,989,723 B2 * | 1/2006 | Komuro et al. | ................ | 333/133 |
| 7,098,575 B2 * | 8/2006 | Mehta | ........................... | 310/324 |
| 7,212,082 B2 * | 5/2007 | Nagao et a | ..................... | 333/187 |
| 7,342,351 B2 * | 3/2008 | Kubo et al. | .................... | 310/344 |
| 7,370,940 B2 * | 5/2008 | Hashimoto | ..................... | 347/54 |
| 7,504,910 B2 * | 3/2009 | Kawamura et al. | ........... | 333/187 |
| 7,560,853 B2 * | 7/2009 | Sano et al. | .................... | 310/324 |
| 7,619,492 B2 * | 11/2009 | Ha et al. | ........................ | 333/187 |
| 2004/0135644 A1 * | 7/2004 | Mizoguchi et al. | ........... | 331/154 |
| 2005/0184627 A1 * | 8/2005 | Sano et al. | .................... | 310/363 |
| 2006/0033595 A1 * | 2/2006 | Nagao et al. | .................. | 333/189 |
| 2006/0267711 A1 * | 11/2006 | Yanase et al. | ................. | 333/187 |
| 2007/0013268 A1 * | 1/2007 | Kubo et al. | .................... | 310/324 |
| 2007/0121972 A1 * | 5/2007 | Suzuki et al. | ................. | 381/174 |
| 2007/0196946 A1 * | 8/2007 | Kasai et al. | .................... | 438/50 |
| 2008/0099428 A1 * | 5/2008 | Kubo et al. | .................... | 216/18 |

FOREIGN PATENT DOCUMENTS

JP        06-018345 A        1/1994

* cited by examiner

*Primary Examiner* — N Drew Richards
*Assistant Examiner* — Ankush Singal
(74) *Attorney, Agent, or Firm* — Rabin & Berdo, PC

(57) ABSTRACT

A pressure sensor of the present invention includes a lower substrate which has an insulating layer having a through-hole penetrating from one side to the other side, and an active layer formed to have a uniform thickness on the insulating layer and having a portion facing the through-hole as an oscillating portion capable of oscillating in a direction opposing the through-hole; a lower electrode formed on the oscillating portion; an upper substrate arranged opposite to the active layer and having a recess at a portion opposed to the oscillating portion; and an upper electrode formed on the recess.

5 Claims, 5 Drawing Sheets

PRESSURE SENSOR AND METHOD FOR MANUFACTURING THE PRESSURE SENSOR

BACKGROUND OF THE INVENTION

1. Field of the Invention

The present invention relates to a pressure sensor and a method for manufacturing the pressure sensor.

2. Description of Related Art

Conventionally, for pressure measurements and pressure switches of industrial machinery, pressure sensors manufactured according to the MEMS (Micro Electro Mechanical Systems) technique are used. As a pressure sensor, a capacitive detection type pressure sensor which detects a pressure based on an amount of change in capacitor capacity which changes according to an input pressure is known.

FIG. 5 is a schematic sectional view of a conventional pressure sensor.

The pressure sensor 101 includes a silicon substrate 102, a support substrate 103 for supporting the silicon substrate 102, and a sealing substrate 104 for sealing the silicon substrate 102.

On the silicon substrate 102, an upper recess 105 and a lower recess 106 are formed by wet-etching one side (upper side) and the other side (lower side) of the central portion of the silicon substrate in the thickness direction. By forming the upper recess 105 and the lower recess 106, a diaphragm 107 with a thickness smaller than the thickness of the peripheral portion surrounding the central portion (thickness of the silicon substrate 102 main body) is formed at the central portion of the silicon substrate 102. The thickness of the diaphragm 107 allows the diaphragm 107 to oscillate in the thickness direction of the silicon substrate 102.

In an upper layer portion of the diaphragm 107 facing the upper recess 105, a movable electrode 108 capable of oscillating with the diaphragm 107 is formed. The movable electrode 108 is a diffusion electrode provided with conductivity by diffusion of an impurity, and is uniformly formed in the entire region of the upper layer portion of the diaphragm 107.

Also, on the silicon substrate 102, in a region from the side wall of the upper recess 105 to the peripheral portion of the silicon substrate 102, a movable electrode wiring 109 provided with conductivity by diffusion of an impurity is formed to be continuous to the movable electrode 108. The movable electrode wiring 109 is electrically connected to the movable electrode 108.

Also, on the silicon substrate 102, in a region from the side wall of the upper recess 105 to the peripheral portion of the silicon substrate 102, a fixed electrode wiring 110 provided with conductivity by diffusion of an impurity is formed. The fixed electrode wiring 110 is insulated from the movable electrode 108 and the movable electrode wiring 109.

The support substrate 103 is made of, for example, a heat-resistant glass substrate of Pyrex (registered trademark) glass, etc., and is anodically bonded to the silicon substrate 102. In a portion of the support substrate 103 opposed to the diaphragm 107, a through-hole 111 penetrating through the support substrate 103 in the thickness direction is formed.

The sealing substrate 104 is made of, for example, a heat-resistant glass substrate of Pyrex (registered trademark) glass, etc., and is anodically bonded to the silicon substrate 102. Accordingly, a space 112 surrounded by the inner surfaces of the upper recess 105 and the lower surface of the sealing substrate 104 is held in a vacuum state. To the lower surface of the sealing substrate 104, a fixed electrode 113 made of aluminum is fixed opposite to the movable electrode 108. The fixed electrode 113 is electrically connected to the fixed electrode wiring 110 at a position not shown.

In this pressure sensor 101, the movable electrode 108 and the fixed electrode 113 form a capacitor using these as counter electrodes. To this capacitor (between the movable electrode 108 and the fixed electrode 113), a predetermined voltage is applied via the movable electrode wiring 109 and the fixed electrode wiring 110.

In this state, when a pressure (for example, a gas pressure) is input from the through-hole 111, due to an action of the pressure, the movable electrode 108 oscillates with the diaphragm 107, and the capacitance of the capacitor changes. Then, a voltage fluctuation between the movable electrode 108 and the fixed electrode 113 caused by this capacitance change is output as an electric signal.

The sensitivity of the pressure sensor 101 is designed by changing the thickness of the diaphragm 107. Therefore, to manufacture a pressure sensor with a desired sensitivity, the thickness of the diaphragm 107 must be adjusted to a target thickness by properly controlling wet-etching conditions for the silicon substrate 102.

However, the etching rate of the silicon substrate 102 changes with a temperature change of an etchant. Therefore, even when etching conditions are properly controlled, a difference may occur between the thickness of the manufactured diaphragm 107 and the target thickness.

SUMMARY OF THE INVENTION

An object of the present invention is to provide a pressure sensor capable of controlling the thickness of an oscillating portion which oscillates due to an action of a pressure to various thicknesses with high accuracy, and a method for manufacturing the pressure sensor.

The above-described or other objects, features, and effects of the present invention will become apparent from the following description of preferred embodiments with reference to the attached drawings.

DETAILED DESCRIPTION OF PREFERRED EMBODIMENTS

Figure 1:
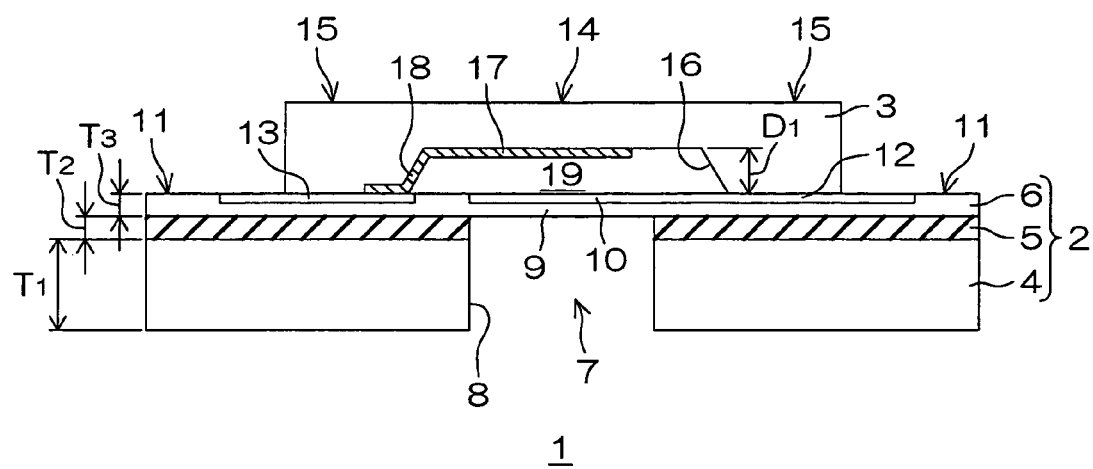
FIG. 1 is a schematic sectional view of a pressure sensor of a first preferred embodiment of the present invention.

A pressure sensor of a preferred embodiment of the present invention includes a lower substrate which has an insulating layer having a through-hole penetrating from one side to the other side, and an active layer formed to have a uniform thickness on the insulating layer and having a portion facing the through-hole as an oscillating portion capable of oscillating in a direction opposing the through-hole; a lower electrode formed on the oscillating portion; an upper substrate arranged opposite to the active layer and having a recess at a portion opposed to the oscillating portion; and an upper electrode formed on the recess.

This pressure sensor can be manufactured according to a method for manufacturing a pressure sensor including the steps of: forming a lower substrate including an insulating layer and an active layer having a uniform thickness formed on the insulating layer; forming a through-hole which penetrates through the insulating layer from one side to the other side and is covered on the other side by the active layer by etching only the insulating layer from the side of the insulating layer; forming a lower electrode on a portion of the active layer, covering the through-hole; forming a recess on an upper substrate for joining to the lower substrate; forming an upper electrode on the recess; and joining the upper substrate and the lower substrate such that the recess and the portion of the active layer, covering the through-hole, are opposed to each other.

According to this method, a lower substrate having an insulating layer and an active layer having a uniform thickness formed on the insulating layer is formed. In the lower substrate, by etching only the insulating layer, a through-hole which penetrates through the insulating layer from one side to the other side and is covered on the other side by the active layer is formed. Accordingly, the portion of the active layer, covering the through-hole, is arranged above the space (through-hole), and an oscillating portion capable of oscillating in the direction opposing the through-hole is formed. On the portion (oscillating portion) of the active layer, covering the through-hole, a lower electrode is formed.

On the other hand, on the upper substrate, a recess is formed. On this recess, an upper electrode is formed.

Then, the upper substrate and the lower substrate are joined such that the recess and the portion (oscillating portion) of the active layer, covering the through-hole, are opposed to each other.

The oscillating portion is formed by etching only the insulating layer, so that the active layer is not etched. In other words, the thickness of the oscillating portion is equal to the thickness of the remaining portion in the active layer. Therefore, in the step of forming the lower substrate, the thickness of the oscillating portion can be determined by controlling the thickness of the active layer. Accordingly, the thickness of the oscillating portion can be controlled with high accuracy. As a result, a pressure sensor with a desired sensitivity can be manufactured easily and with high accuracy.

Also, in the pressure sensor, the lower substrate and the upper substrate are preferably joined to each other by metal joining using a metal joint member.

With this configuration, the lower substrate and the upper substrate are joined by metal joining, so that the joining time can be made shorter than the joining time of anodic bonding.

Also, on the recess, an upper electrode wiring conducting to the upper electrode is formed in a region around the upper electrode, and on the active layer, a lower electrode wiring conducting to the lower electrode is formed in a region around the oscillating portion, and the metal joint member is formed such that a part of the metal joint member is opposed to the upper electrode wiring and another part of the metal joint member is opposed to the lower electrode wiring, and between the portion of the metal joint member, opposed to the upper electrode wiring, and the upper electrode wiring, an insulating film is preferably interposed.

With this configuration, an insulating film is interposed between the portion of the metal joint member, opposed to the upper electrode wiring, and the upper electrode wiring, so that short circuit between the metal joint member and the upper electrode wiring can be prevented.

Also, in the above-described method for manufacturing a pressure sensor, it is preferable that the upper substrate is a glass substrate and the step of forming the recess is a step of etching the glass substrate by means of wet-etching.

According to this method, the recess is formed by wet-etching the glass substrate, so that the side surface of the recess is tapered such that the opening diameter of the recess gradually narrows in the etching direction. Therefore, the side surface of the recess faces the direction toward the opening position of the recess (direction opposite to the etching direction). As a result, a conductive material forming the upper electrode, etc., can be deposited on the side surface of the recess with optimum coverage.

Hereinafter, preferred embodiments of the present invention will be described in detail with reference to the attached drawings.

FIG. 1 is a schematic sectional view of a pressure sensor of a first preferred embodiment of the present invention.

The pressure sensor 1 is a sensor to be used for various purposes such as pressure measurements and pressure switches in industrial machinery. The pressure sensor 1 includes a SOI (Silicon On Insulator) substrate 2 having a square flat shape as a lower substrate, and a sealing substrate 3 as an upper substrate which has a square flat shape smaller than the SOI substrate 2 and is for sealing the SOI substrate 2.

The SOI substrate 2 has a structure in which an N⁻ type active layer 6 made of Si is laminated in the thickness direction on the silicon substrate 4 via a BOX layer 5 made of $SiO_2$ as an insulating layer.

The silicon substrate 4 has a uniform thickness $T_1$ of, for example, 200 to 700 μm. Also, the BOX layer 5 has a uniform thickness $T_2$ of, for example, 0.5 to 5 μm. Also, the active layer 6 has a uniform thickness $T_3$ of, for example, 0.5 to 100 μm, preferably, 20 to 30 μm.

In the SOI substrate 2, at a central portion 7 thereof, a through-hole 8 is formed. The through-hole 8 collectively penetrates through both the silicon substrate 4 and the BOX layer 5 in a direction from one side in the thickness direction (back surface side of the silicon substrate 4) to the other side (upper surface side of the active layer 6) and a terminal end thereof is covered by the back surface of the active layer 6.

Accordingly, the active layer 6 has a diaphragm 9 as an oscillating portion capable of oscillating in the direction opposing the through-hole 8 on the portion opposed to the through-hole 8 (space without the existence of the silicon substrate 4 and the BOX layer 5).

In the upper layer portion (surface layer portion on the side opposite to the through-hole 8) at the central portion of the diaphragm 9, a movable electrode 10 as a lower electrode capable of oscillating with the diaphragm 9 is formed. The movable electrode 10 is a diffusion electrode provided with conductivity by diffusion of a P type impurity into the N⁻ type active layer 6, and has a uniform P type impurity concentration.

In the upper layer portion of the active layer 6, a movable electrode wiring 12 is formed on a portion from the peripheral edge portion surrounding the central portion of the diaphragm 9 to the peripheral portion 11 (region on the BOX layer 5) surrounding the central portion 7 of the SOI substrate 2. The movable electrode wiring 12 is a diffusion wiring provided with conductivity by diffusion of an impurity similar to the movable electrode 10, and is formed to be continuous to the movable electrode 10. Accordingly, the movable electrode wiring 12 is electrically connected to the movable electrode 10.

Also, on the peripheral portion 11 in the SOI substrate 2, a fixed electrode wiring 13 is formed in the upper layer portion of the active layer 6. The fixed electrode wiring 13 is a diffusion wiring provided with conductivity by diffusion of an impurity similar to the movable electrode 10, and is insulated from the movable electrode 10 and the movable electrode wiring 12.

For example, the sealing substrate 3 is made of a heat-resistant glass substrate of Pyrex (registered trademark) glass, etc. On the sealing substrate 3, at the central portion 14 thereof, a recess 16 is formed by forming one side surface (back surface) to be one-step lower to the other side (upper surface side) than the peripheral portion 15 surrounding the central portion 14. The depth $D_1$ from the back surface of the sealing substrate 3 in the peripheral portion 15 to the bottom surface of the recess 16 is, for example, 1 to 50 μm.

The side surface of the recess 16 is tapered such that the opening diameter narrows in a direction toward the bottom surface of the recess 16 (direction from one side in the thickness direction to the other side of the sealing substrate 3).

On the bottom surface of the recess 16, at the central portion thereof, a fixed electrode 17 made of aluminum as an upper electrode is formed. In a region from the peripheral edge portion of the bottom surface of the recess 16 to the back surface of the peripheral portion 15 of the sealing substrate 3 via the side surface of the recess, a routed wiring 18 made of aluminum routed from the fixed electrode 17 is formed. The routed wiring 18 is formed integrally with the fixed electrode 17, and is electrically connected to the fixed electrode 17.

Then, the sealing substrate 3 is joined to the SOI substrate 2 by anodically bonding the peripheral portion 15 and the peripheral portion 11 of the SOI substrate 2 in a posture in which the fixed electrode 17 and the movable electrode 10 are opposed to each other. Accordingly, the space 19 surrounded by the inner surfaces (the side surface and the bottom surface) of the recess 16 and the upper surface of the diaphragm 9 is held in a vacuum state. To the peripheral portion 11 of the SOI substrate 2, the movable electrode wiring 12 and the fixed electrode wiring 13 are exposed from the joined sealing substrate 3. To the exposed portions of the movable electrode wiring 12 and the fixed electrode wiring 13, wirings from the outside are connected.

In this pressure sensor 1, the movable electrode 10 and the fixed electrode 17 form a capacitor using these as counter electrodes. A predetermined voltage is applied to this capacitor (between the movable electrode 10 and the fixed electrode 17) via the movable electrode wiring 12 and the fixed electrode wiring 13.

In this state, when a pressure (for example, gas pressure) is input from the through-hole 8, due to an action of the pressure, the movable electrode 10 oscillates with the diaphragm 9, and the capacitance of the capacitor changes. Then, a voltage fluctuation between the movable electrode 10 and the fixed electrode 17 caused by this capacitance change is output as an electric signal.

FIG. 2A to FIG. 2G are schematic sectional views for describing a method for manufacturing the pressure sensor shown in FIG. 1 in order of steps.

Figure 2A:
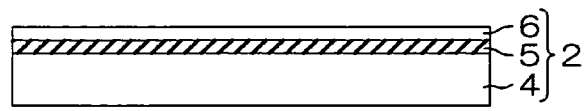
FIG. 2A to FIG. 2G are schematic sectional views for describing a method for manufacturing the pressure sensor shown in FIG. 1 in order of steps.

To manufacture the pressure sensor 1 shown in FIG. 1, as shown in FIG. 2A, an SOI substrate 2 having a structure in which an active layer 6 is laminated on a silicon substrate 4 via a BOX layer 5 is formed. In detail, a BOX layer 5 (thickness $T_2$) is formed on the surface of the silicon substrate 4 (thickness $T_1$) by thermal oxidation treatment. On the other hand, a silicon substrate with a thickness $T_3$ equal to the thickness of the active layer 6 is prepared. Then, in a state in which this silicon substrate and the BOX layer 5 are opposed to each other, by joining the silicon substrates together, a SOI substrate 2 is formed.

Figure 2D:
Figure 2B:
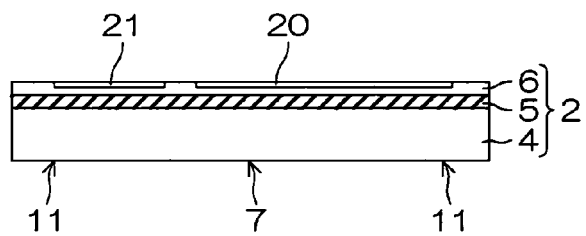

Next, as shown in FIG. 2B, a P type impurity is ion-implanted into the upper layer portion of the active layer 6 via a mask (not shown) having openings separated from each other. After ion implantation, the implanted P type impurity is activated by annealing. Accordingly, in the upper layer portion of the active layer 6, a first impurity region 20 is formed in a region from the central portion 7 to the peripheral portion 11 of the SOI substrate 2. In a region spaced from the first impurity region 20 in the peripheral portion 11, a second impurity region 21 is formed.

Figure 2E:
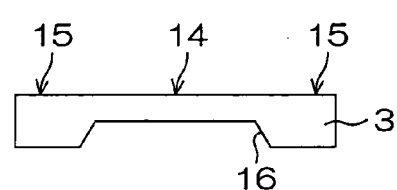
Figure 2C:
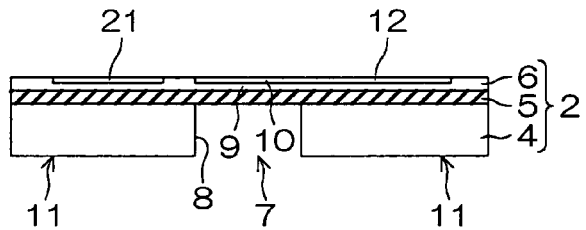

Next, as shown in FIG. 2C, an etching gas is supplied to the silicon substrate 4 via a mask (not shown) having an opening for exposing the back surface in the central portion 7 of the SOI substrate 2 (back surface of the silicon substrate 4). As the etching gas, a gas capable of etching silicon and silicon oxide is used, and in detail, a fluorine-based gas such as $CF_4$ or $SF_6$ is used. Then, the supply of the etching gas is continued until the silicon substrate 4 and the BOX layer 5 are removed and the back surface of the active layer 6 is exposed.

Accordingly, a through-hole 8 is formed at the central portion 7 of the SOI substrate 2. Also, by forming the through-hole 8, a diaphragm 9 capable of oscillating is formed at the portion of the active layer 6 opposed to the through-hole 8. Further, a movable electrode 10 made of a part of the first impurity region 20 is formed in the upper layer portion of the diaphragm 9, and a movable electrode wiring 12 made of the remaining part of the first impurity region 20 is formed.

On the other hand, as shown in FIG. 2D, a sealing substrate 3 made of a heat-resistant glass is prepared.

Next, as shown in FIG. 2E, an etchant is supplied to the sealing substrate 3 via a mask (not shown) having an opening for exposing the back surface of the central portion 14 of the sealing substrate 3. As the etchant, for example, HF or the like is used. By supplying the etchant, the sealing substrate 3 is wet-etched from the back surface side. Accordingly, a recess 16 having a tapered side surface is formed on the sealing substrate 3.

Figure 2F:
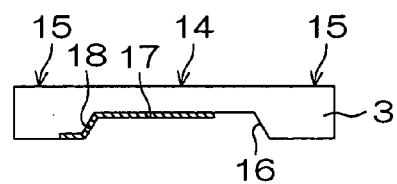

Next, as shown in FIG. 2F, by sputtering, an aluminum material is deposited on the inner surfaces (the side surface and the bottom surface) of the recess 16 and the peripheral portion 15 of the sealing substrate 3 from the back surface side of the sealing substrate 3 via a mask (not shown) having an opening in a predetermined pattern. Accordingly, a fixed electrode 17 and a routed wiring 18 are formed integrally.

Figure 2G:
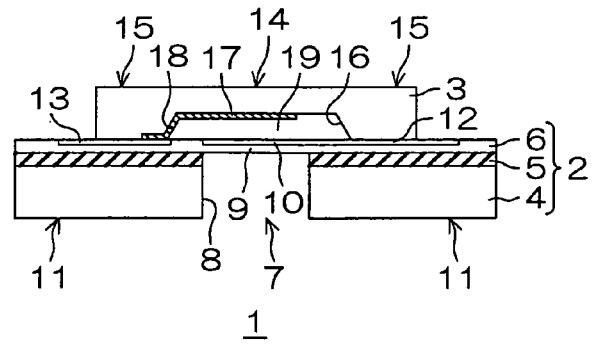

Thereafter, as shown in FIG. 2G, the peripheral portion 15 of the sealing substrate 3 is brought into contact with the peripheral portion 11 of the SOI substrate 2 such that the fixed electrode 17 and the movable electrode 10 are opposed to each other and the routed wiring 18 and the second impurity region 21 are opposed to each other. Then, in this state, heating is applied, for example, at 250 to 350° C. for 0.5 to 2 hours. Accordingly, the peripheral portion 11 of the SOI substrate 2 and the peripheral portion 15 of the sealing substrate 3 are anodically bonded to each other. The second impurity region 21 formed in the active layer 6 becomes a fixed electrode wiring 13 by being connected to the routed wiring 18.

Through the above-described steps, the pressure sensor 1 shown in FIG. 1 is obtained.

According to the method described above, by etching the silicon substrate 4 and the BOX layer 5 until the back surface of the active layer 6 is exposed, the diaphragm 9 is formed (see FIG. 2C). Therefore, the active layer 6 with a uniform thickness $T_3$ is not etched. In other words, the thickness of the diaphragm 9 is equal to the thickness $T_3$ of the remaining portion (portion other than the diaphragm 9) of the active layer 6. Therefore, in the process of forming the SOI substrate 2 (see FIG. 2A), the thickness of the diaphragm 9 can be determined by controlling the thickness of the active layer 6. Accordingly, the thickness of the diaphragm 9 can be controlled with high accuracy. As a result, a pressure sensor 1 with a desired sensitivity can be manufactured easily and with high accuracy.

Also, the recess 16 is formed by wet etching (see FIG. 2E), so that the side surface of the recess 16 is tapered such that the opening diameter of the recess 16 gradually narrows in the etching direction (direction from the back surface side to the upper surface side of the sealing substrate 3). Therefore, the side surface of the recess 16 faces the back surface side of the sealing substrate 3 (the side opposite to the etching direction). Therefore, the material of the fixed electrode 17 and the routed wiring 18 supplied from the back surface side of the sealing substrate 3 can be deposited on the side surface of the recess with optimum coverage.

Figure 3:
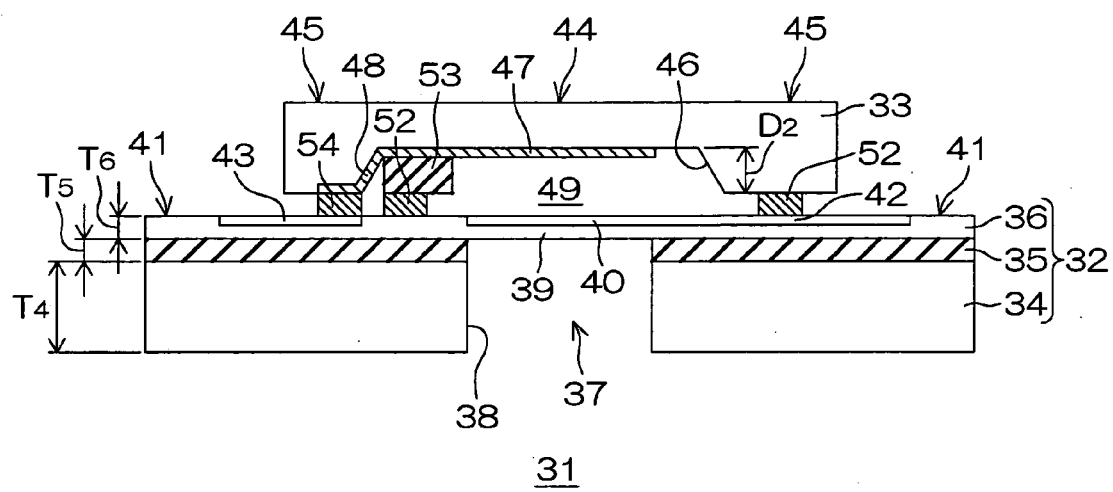
FIG. 3 is a schematic sectional view of a pressure sensor of a second preferred embodiment of the present invention.

FIG. 3 is a schematic sectional view of a pressure sensor of a second preferred embodiment of the present invention.

The pressure sensor 31 is a sensor to be used for various purposes such as pressure measurements and pressure switches in industrial machinery. The pressure sensor 31 includes an SOI (Silicon On Insulator) substrate 2 having a square flat shape as a lower substrate, and a sealing substrate 33 as an upper substrate which has a square flat shape smaller than the SOI substrate 32 and is for sealing the SOI substrate 32.

The SOI substrate 32 has a structure in which an N⁻ type active layer 36 made of Si is laminated in the thickness direction on the silicon substrate 34 via a BOX layer 35 as an insulating layer made of $SiO_2$.

The silicon substrate 34 has a uniform thickness $T_4$ of, for example, 200 to 700 μm. Also, the BOX layer 35 has a uniform thickness $T_5$ of, for example, 0.5 to 5 μm. Also, the active layer 36 has a uniform thickness $T_6$ of, for example, 0.5 to 100 μm, preferably, 20 to 30 μm.

In the SOI substrate 32, at the central portion 37 thereof, a through-hole 38 is formed. The through-hole 38 collectively penetrates both the silicon substrate 34 and the BOX layer 35 in a direction from one side in the thickness direction (back surface side of the silicon substrate 34) to the other side (upper surface side of the active layer 36), and the terminal end thereof is covered by the back surface of the active layer 36.

Accordingly, the active layer 36 has a diaphragm 39 as an oscillating portion capable of oscillating in a direction opposing the through-hole 38 on the portion opposed to the through-hole 38 (space without the existence of the silicon substrate 34 and the BOX layer 35).

In the upper layer portion (surface layer portion on the side opposite to the through-hole 38) in the central portion of the diaphragm 39, a movable electrode 40 as a lower electrode capable of oscillating with the diaphragm 39 is formed. The movable electrode 40 is a diffusion electrode provided with conductivity by diffusion of a P type impurity into the N⁻ type active layer 36, and has a uniform P type impurity concentration.

In the upper layer portion of the active layer 36, at a portion from the peripheral edge portion surrounding the central portion of the diaphragm 39 to the peripheral portion 41 (region on the BOX layer 35) surrounding the central portion 37 of the SOI substrate 32, a movable electrode wiring 42 is formed. The movable electrode wiring 42 is a diffusion wiring provided with conductivity by diffusion of an impurity similar to the movable electrode 40, and is formed to be continuous to the movable electrode 40. Accordingly, the movable electrode wiring 42 is electrically connected to the movable electrode 40.

Also, on the peripheral portion 41 of the SOI substrate 32, in the upper layer portion of the active layer 36, a fixed electrode wiring 43 is formed. The fixed electrode wiring 43 is a diffusion wiring provided with conductivity by diffusion of an impurity similar to the movable electrode 40, and is insulated from the movable electrode 40 and the movable electrode wiring 42.

The sealing substrate 33 is made of, for example, a heat-resistant glass substrate of Pyrex (registered trademark) glass, etc. On the sealing substrate 33, at the central portion 44 thereof, a recess 46 is formed by forming one side surface (back surface) one-step lower to the other surface side (upper surface side) than the peripheral portion 45 surrounding the central portion 44. The depth $D_2$ from the back surface of the sealing substrate 33 in the peripheral portion 45 to the bottom surface of the recess 46 is for example, 1 to 50 μm.

The side surface of the recess 46 is tapered such that the opening diameter narrows in the direction toward the bottom surface of the recess 46 (direction from one side in the thickness direction to the other side of the sealing substrate 33).

On the bottom surface of the recess 46, at the central portion thereof, a fixed electrode 47 made of aluminum as an upper electrode is formed. In a region from the peripheral edge portion of the bottom surface of the recess 46 to the back surface of the peripheral portion 45 of the sealing substrate 3 via the side surface of the recess, a routed wiring 48 which is made of aluminum and routed from the fixed electrode 47 is formed. The routed wiring 48 is formed integrally with the fixed electrode 47, and is electrically connected to the fixed electrode 47.

Then, the sealing substrate 33 is metal-joined to the SOI substrate 32 by interposing a metal joint member 52 between the peripheral portion 45 and the peripheral portion 41 of the SOI substrate 32 in a posture in which the fixed electrode 47 and the movable electrode 40 are opposed to each other.

The metal joint member 52 is made of, for example, a Cu—Sn alloy, an Au—Sn alloy, or the like. The metal joint member 52 has a square annular shape in a plan view which surrounds the diaphragm 39, and is arranged so that a part of the metal joint member is opposed to the routed wiring 48, and another part of the metal joint member is opposed to the movable electrode wiring 42. Also, between the portion of the metal joint member 52, opposed to the routed wiring 48, and the portion of the routed wiring 48 on the bottom surface of the recess 46, an insulating spacer 53 made of silicon oxide is interposed.

In other words, by supporting the peripheral portion 45 of the sealing substrate 33 with the metal joint member 52 and supporting the central portion 44 of the sealing substrate with the metal joint member 52 and the insulating spacer 53, the sealing substrate 33 is metal-joined to the SOI substrate 32. Accordingly, the space 49 surrounded by the inner surfaces (the side surface and the bottom surface) of the recess 46, the upper surface of the diaphragm 39, the metal joint member 52, and the insulating spacer 53 is held in a vacuum state.

Also, between the portion on the back surface of the peripheral portion 45 in the routed wiring 48 and the fixed electrode wiring 43, a conductive spacer 54 with a height substantially equal to that of the metal joint member 52 is interposed in contact with these members. The conductive spacer 54 is made of, for example, a material similar to that of the metal joint member 52, and is electrically connected to the routed wiring 48 and the fixed electrode wiring 43.

On the peripheral portion 41 of the SOI substrate 32, the movable electrode wiring 42 and the fixed electrode wiring 43 are exposed from the joined sealing substrate 33. To the portions on which the movable electrode wiring 42 and the fixed electrode wiring 43 are exposed, wirings from the outside are connected.

In this pressure sensor 31, the movable electrode 40 and the fixed electrode 47 form a capacitor using these as counter electrodes. To this capacitor (between the movable electrode 40 and the fixed electrode 47), a predetermined voltage is applied via the movable electrode wiring 42 and the fixed electrode wiring 43.

In this state, when a pressure (for example, gas pressure) is input from the through-hole 38, due to an action of the pressure, the movable electrode 40 oscillates with the diaphragm 39 and the capacitance of the capacitor changes. Then, a voltage fluctuation between the movable electrode 40 and the fixed electrode 47 caused by this capacitance change is output as an electric signal.

FIG. 4A to FIG. 4H are schematic sectional views for describing a method for manufacturing the pressure sensor shown in FIG. 3 in order of steps.

Figure 4A:
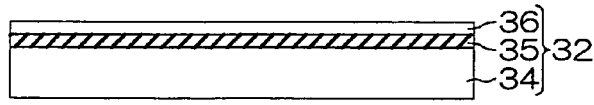
FIG. 4A to FIG. 4H are schematic sectional views for describing a method for manufacturing the pressure sensor shown in FIG. 3 in order of steps.

To manufacture the pressure sensor 31 shown in FIG. 3, as shown in FIG. 4A, a SOI substrate 32 having a structure in which an active layer 36 is laminated on a silicon substrate 34 via a BOX layer 35 is formed. In detail, by thermal oxidation treatment, the BOX layer 35 (thickness $T_5$) is formed on the surface of the silicon substrate 34 (thickness $T_4$). On the other hand, a silicon substrate with a thickness $T_6$ equal to the thickness of the active layer 36 is prepared. Then, in a state in which this silicon substrate and the BOX layer 35 are opposed to each other, by joining the silicon substrates together, the SOI substrate 32 is formed.

Figure 4E:
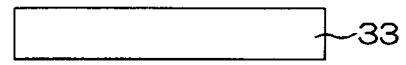
Figure 4B:
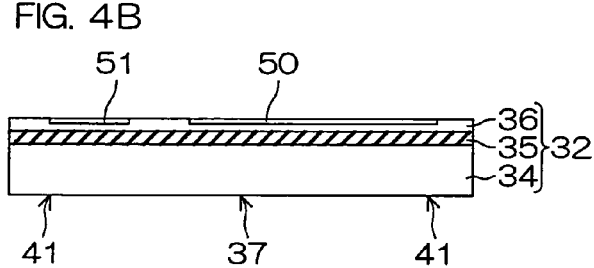

Next, as shown in FIG. 4B, a P type impurity is ion-implanted into the upper layer portion of the active layer 36 via a mask (not shown) having openings separated from each other. After ion implantation, by annealing, the implanted P type impurity is activated. Accordingly, in the upper layer portion of the active layer 36, a first impurity region 50 is formed in a region from the central portion 37 to the peripheral portion 41 of the SOI substrate 2. Further, in a region spaced from the first impurity region 50 in the peripheral portion 41, a second impurity region 51 is formed.

Figure 4F:
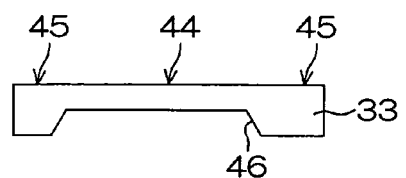
Figure 4C:
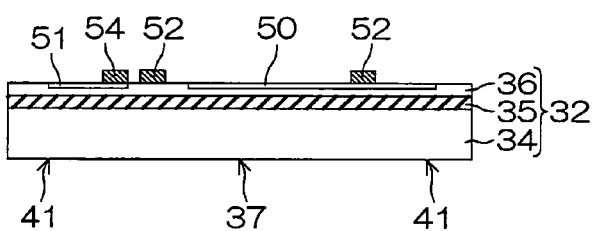

Next, as shown in FIG. 4C, the material of the metal joint member 52 and the conductive spacer 54 is deposited on the upper surface of the active layer 36. Then, according to a known photolithography technique and etching technique, by removing unnecessary portions of the deposited material (portions other than the metal joint member 52 and the conductive spacer 54), the metal joint member 52 and the conductive spacer 54 are formed.

Figure 4G:
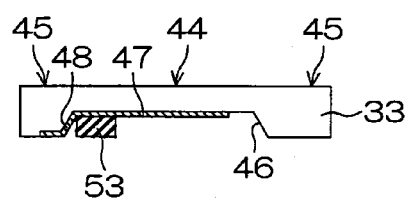
Figure 4D:
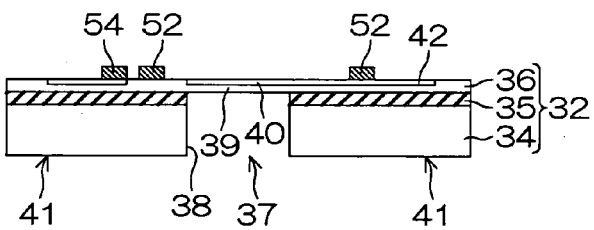

Then, as shown in FIG. 4D, an etching gas is supplied to the silicon substrate 34 via a mask (not shown) having an opening for exposing the back surface in the central portion 37 of the SOI substrate 32 (back surface of the silicon substrate 34). As the etching gas, a gas capable of etching silicon and silicon oxide is used, and in detail, a fluorine-based gas such as $CF_4$ or $SF_6$ is used. Then, the supply of the etching gas is continued until the silicon substrate 34 and the BOX layer 35 are removed and the back surface of the active layer 36 is exposed.

Accordingly, at the central portion 37 of the SOI substrate 32, a through-hole 38 is formed. Also, by forming the through-hole 38, on a portion of the active layer 36, opposed to the through-hole 38, a diaphragm 39 capable of oscillating is formed. Further, a movable electrode 40 made of a part of the first impurity region 50 is formed in the upper layer portion of the diaphragm 39, and a movable electrode wiring 42 made of the remaining part of the first impurity region 50 is formed.

On the other hand, as shown in FIG. 4E, a sealing substrate 33 made of heat-resistant glass is prepared.

Then, as shown in FIG. 4F, an etchant is supplied to the sealing substrate 33 via a mask (not shown) having an opening for exposing the back surface of the central portion 44 of the sealing substrate 33. As the etchant, for example, HF or the like is used. By the supply of the etchant, the sealing substrate 33 is wet-etched from the back surface side. Accordingly, a recess 46 having a tapered side surface is formed on the sealing substrate 33.

Then, as shown in FIG. 4G, by sputtering, an aluminum material is deposited on the inner surfaces (the side surface and the bottom surface) of the recess 46 and the peripheral portion 45 of the sealing substrate 33 from the back surface side of the sealing substrate 33 via a mask (not shown) having an opening in a predetermined pattern. Accordingly, a fixed electrode 47 and a routed wiring 48 are formed integrally. Then, as shown in FIG. 4G, by a CVD (Chemical Vapor Deposition) method, silicon oxide is deposited on the inner surfaces of the recess 46 and the back surface of the sealing substrate 3. Then, according to a known photolithography technique and etching technique, by removing unnecessary portions (portions other than an insulating spacer 53) of deposited oxide silicon, the insulating spacer 53 is formed.

Figure 4H:
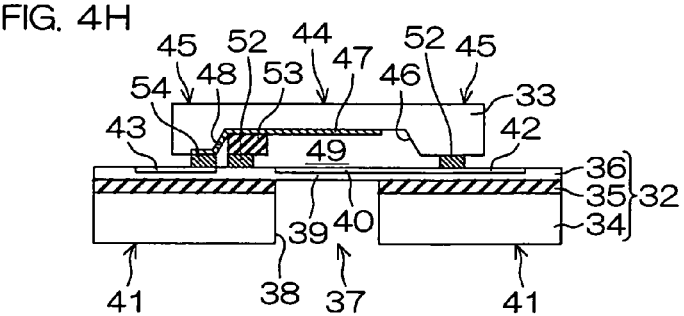
Figure 5:
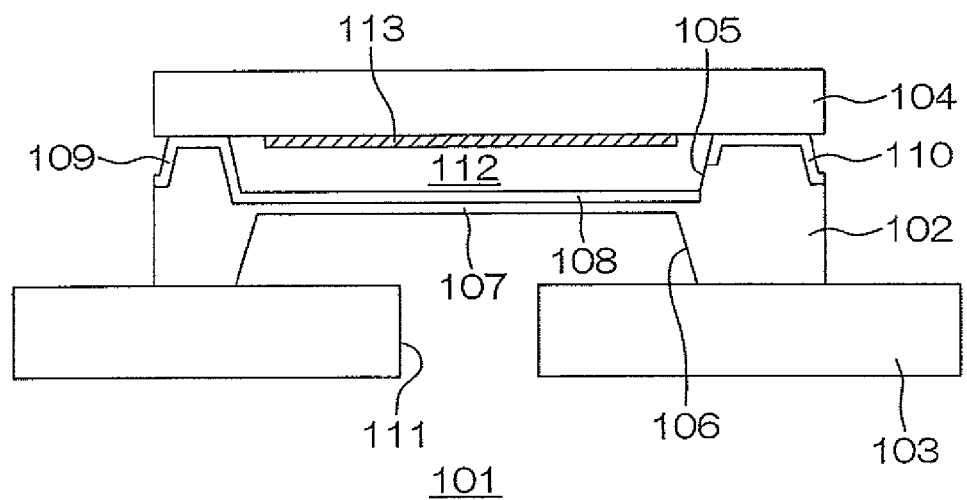
FIG. 5 is a schematic sectional view of a conventional pressure sensor.

Thereafter, as shown in FIG. 4H, the insulating spacer 53 and the peripheral portion 45 of the sealing substrate 33 are brought into contact with the metal joint member 52 such that the fixed electrode 47 and the movable electrode 40 are opposed to each other and the routed wiring 48 and the conductive spacer 54 are opposed to each other. Then, in this state, for example, heating is applied, for example, at 300 to 350° C. for 5 to 10 seconds. Accordingly, the peripheral portion 41 of the SOI substrate 32 and the peripheral portion 45 of the sealing substrate 33 are metal-joined to each other. The second impurity region 51 formed in the active layer 36 becomes a fixed electrode wiring 43 by being connected to the routed wiring 48 via a conductive spacer 54.

Through the above-described steps, the pressure sensor 31 shown in FIG. 3 is obtained.

According to the method described above, by etching the silicon substrate 34 and the BOX layer 35 until the back surface of the active layer 36 is exposed, the diaphragm 39 is formed (see FIG. 4D). Therefore, the active layer 36 with the uniform thickness $T_6$ is not etched. In other words, the thickness of the diaphragm 39 is equal to the thickness $T_6$ of the remaining portion (portion other than the diaphragm 39) of the active layer 36. Accordingly, in the process of forming the SOI substrate 32 (see FIG. 4A), the thickness of the diaphragm 39 can be determined by controlling the thickness of the active layer 36. Therefore, the thickness of the diaphragm 39 can be controlled with high accuracy. As a result, a pressure sensor 31 with a desired sensitivity can be manufactured easily and with high accuracy.

Further, the recess 46 is formed by wet-etching (see FIG. 4F), so that the side surface of the recess 46 is tapered such that the opening diameter of the recess 46 gradually narrows in the etching direction (direction from the back surface side to the upper surface side of the sealing substrate 33). Therefore, the side surface of the recess 46 faces the back surface side (the side opposite to the etching direction) of the sealing substrate 33. Accordingly, the material of the fixed electrode 47 and the routed wiring 48 supplied from the back surface side of the sealing substrate 33 can be deposited on the side surface of the recess with optimum coverage.

Also, the SOI substrate 32 and the sealing substrate 33 are joined to each other by metal joining via the metal joint member 52, so that the joining time can be made shorter than the joining time of anodic bonding.

Further, between the portion of the metal joint member 52, opposed to the routed wiring 48, and the routed wiring 48, the insulating spacer 53 made of silicon oxide is interposed. Therefore, short circuit between the metal joint member 52 and the routed wiring 48 can be prevented.

The preferred embodiments of the present invention are described above, however, the present invention can also be carried out in other embodiments.

For example, the sealing substrates 3 and 33 may be silicon substrates.

Also, the recesses 16 and 46 may be formed by dry-etching the sealing substrate 3 and 33.

The preferred embodiments of the present invention are only specific examples to describe the technical content of the present invention, and the present invention is not to be construed as limited to these specific examples. The spirit and scope of the present invention are restricted only by the appended claims.

The present application corresponds to Japanese Patent Application No. 2008-262906 filed in the Japan Patent Office on Oct. 9, 2008, and the entire disclosure of the application is incorporated herein by reference.

What is claimed is:

1. A pressure sensor comprising:
    a lower substrate which has an insulating layer having a through-hole penetrating from one side to the other side, and an active layer formed to have a uniform thickness on the insulating layer and having a portion facing the through-hole as an oscillating portion capable of oscillating in a direction opposing the through-hole;
    a lower electrode formed on the oscillating portion;
    an upper substrate arranged opposite to the active layer and having a recess at a portion opposed to the oscillating portion; and
    an upper electrode formed on the recess.

2. The pressure sensor according to claim 1, wherein
    the lower substrate and the upper substrate are joined to each other by metal joining using a metal joint member.

3. The pressure sensor according to claim 2, wherein
    on the recess, an upper electrode wiring conducting to the upper electrode is formed in a region around the upper electrode,
    on the active layer, a lower electrode wiring conducting to the lower electrode is formed in a region around the oscillating portion,
    the metal joint member is formed such that a part of the metal joint member is opposed to the upper electrode wiring and another part of the metal joint member is opposed to the lower electrode wiring, and
    between the portion of the metal joint member, opposed to the upper electrode wiring, and the upper electrode wiring, an insulating film is interposed.

4. A method for manufacturing a pressure sensor comprising the steps of:
    forming a lower substrate including an insulating layer and an active layer having a uniform thickness formed on the insulating layer;
    forming a through-hole which penetrates through the insulating layer from one side to the other side and is covered on the other side by the active layer by etching only the insulating layer from the side of the insulating layer;
    forming a lower electrode on a portion of the active layer, covering the through-hole;
    forming a recess on an upper substrate for joining to the lower substrate;
    forming an upper electrode on the recess; and
    joining the upper substrate and the lower substrate such that the recess and the portion of the active layer, covering the through-hole, are opposed to each other.

5. The method for manufacturing a pressure sensor according to claim 4, wherein
    the upper substrate is a glass substrate, and
    the step of forming the recess is a step of etching the glass substrate by means of wet-etching.

* * * * *